United States Patent [19]

Aitken et al.

[11] Patent Number: 5,367,012

[45] Date of Patent: Nov. 22, 1994

[54] STABILIZER FOR GLASS/POLYMER ALLOYS

[75] Inventors: Bruce G. Aitken; Dana C. Bookbinder; James E. Dickinson, Jr.; Brent M. Wedding, all of Corning, N.Y.

[73] Assignee: Corning Incorporated, Corning, N.Y.

[21] Appl. No.: 100,835

[22] Filed: Aug. 9, 1993

Related U.S. Application Data

[63] Continuation-in-part of Ser. No. 943,014, Sep. 10, 1992, abandoned.

[51] Int. Cl.⁵ .................... C08K 3/32; C08L 67/00; C08L 71/00; C08L 23/00
[52] U.S. Cl. ........................... 523/451; 523/514; 523/515; 523/516; 524/403; 524/414; 524/417
[58] Field of Search ............ 523/451, 514, 515, 516; 524/403, 414, 417

[56] References Cited

U.S. PATENT DOCUMENTS

| | | | |
|---|---|---|---|
| 2,577,627 | 12/1951 | Pincus | 106/47 |
| 3,746,556 | 7/1973 | Morgan | 106/47 |
| 3,816,107 | 6/1974 | Searight et al. | 65/30 |
| 3,933,514 | 1/1976 | Banks et al. | 106/75 |
| 4,049,779 | 9/1977 | Ropp | 423/309 |
| 4,079,022 | 3/1978 | Ferrarini, Jr. et al. | 260/2.5 |
| 5,043,369 | 8/1991 | Bahn et al. | 523/466 |
| 5,214,092 | 5/1993 | Gloesener et al. | 524/425 |

*Primary Examiner*—John C. Bleutge
*Assistant Examiner*—D. R. Wilson
*Attorney, Agent, or Firm*—Timothy M. Schaeberle; Clinton S. Janes, Jr.

[57] ABSTRACT

This invention is directed to an alloy, and a method of producing an alloy, of increased resistance to moisture, comprising a melt mixture of at least one phosphate glass, at least one organic thermoplastic or thermosetting polymer, and an amount of a water soluble stabilizer component which provides a source of metal cations having a valency of 2+ or higher The amount of the stabilizer component added is that amount effective to improve the alloy's resistance to moisture. Preferably, the alloy is comprised of: (a) 5–80% of the matrix material; (b) 15–90% of the phosphate glass; and, (c) 0.1 to 40% of the stabilizer component. Additionally, the metal cations which are found in the stabilizer component and which form part of the insoluble surface layer are preferably selected from the group consisting of $Ba^{2+}$, $Mg^{2+}$, $Ca^{2+}$, $Al^{3+}$, $Zn^{2+}$, $Sr^{+2}$ and $Fe^{3+}$.

5 Claims, 5 Drawing Sheets

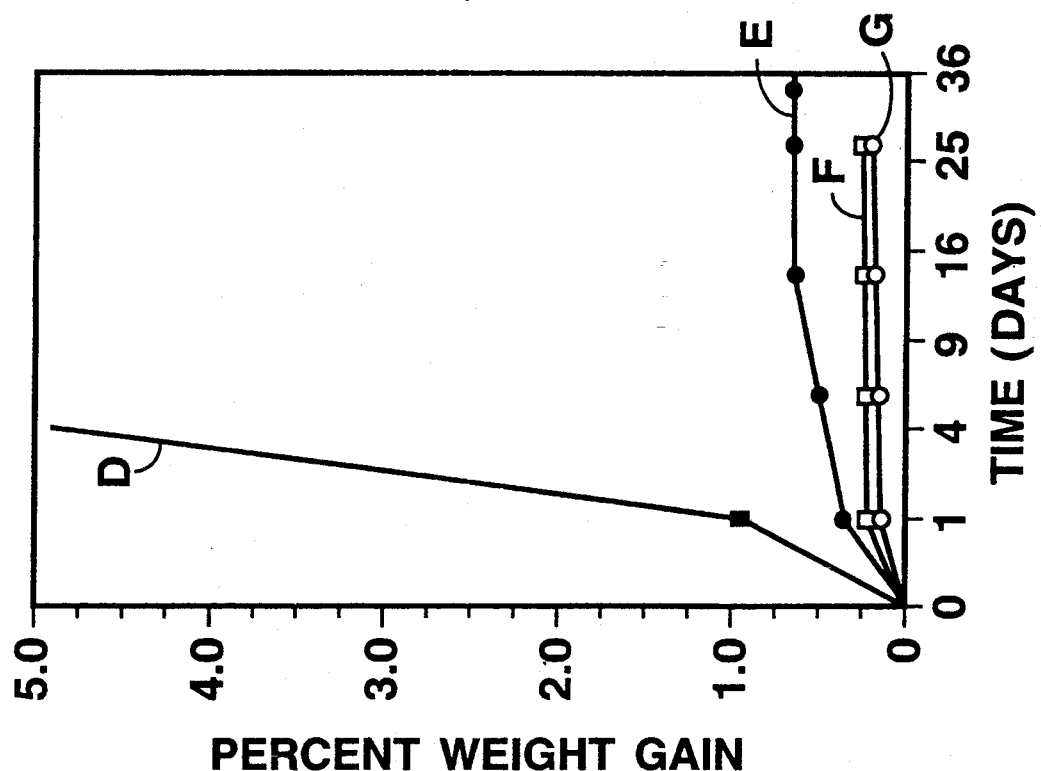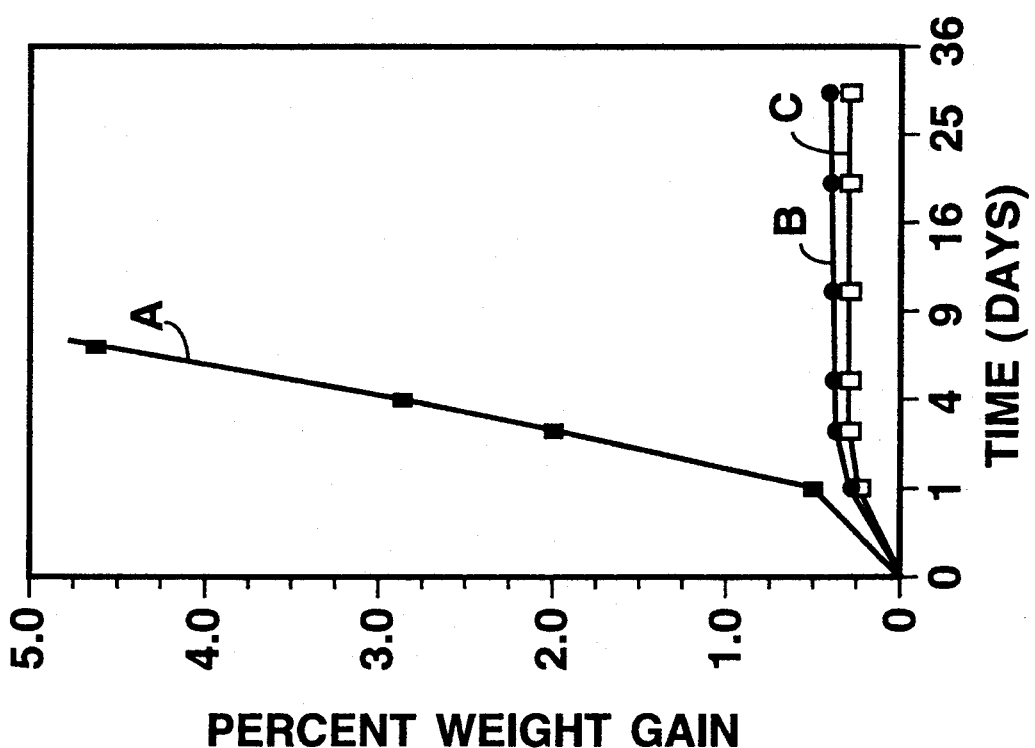

STABILIZER FOR GLASS/POLYMER ALLOYS

RELATED APPLICATIONS

This application is a continuation-in-part of U.S. patent application Ser. No. 07/943,014, filed on Sep. 10, 1992, now abandoned, by B. Aitken et al. under the title "Stabilizer for Glass/Polymer Alloys". This application is also related to U.S. patent application Ser. No. 08/112,057, filed Aug. 30, 1993, which is a continuation-in-part of application Ser. No. 07/942,815, filed Sep. 10, 1992, now abandoned, by B. Aitken et al. under the title "Stabilizer for Glass/Polymer Composites".

FIELD OF THE INVENTION

The present invention relates to a more durable glass/polymer blend and a method for increasing the durability of the blend. In general, it involves the addition of a stabilizer component to a glass/polymer alloy, which may cause the formation, in the presence of moisture, of an insoluble surface coating on the glass phase, resulting in an increased durability to hydration.

BACKGROUND OF THE INVENTION

The preparation of and the microstructures of glass/polymer alloys have been described in U.S. Pat. No. 5,043,369 (Bahn et al.). As explained therein, alloy articles consist essentially of an inorganic oxide glass, preferably a phosphate-based glass, and an organic thermoplastic or thermosetting polymer having a working temperature compatible with that of the glass. The low temperature phosphate glass is "melt mixed" with the polymer at the working temperature to form an intimate mixture; i.e., the glass and the polymer are both in a sufficiently fluid state to be blended together to yield a body exhibiting an essentially uniform, fine-grained microstructure.

Although the durability of the melt blends disclosed in the Bahn et al. patent was enormously better than that found in the prior art, those blends still exhibited some moisture corrosion, thus leading to changes in the constitution of the alloy body, including swelling and/or increased weight and volume, and to degradation in such alloy properties as reduced tensile, flexural, and impact strengths. Since it is very important that these alloys maintain their physical performance properties over an extended period of time, research was undertaken to discover methods for increasing the alloy's durability. Additionally, this search for increased durability was driven by both customer and industry demand for better and more durable materials.

It was surmised that increasing the durability might also open new application opportunities not currently contemplated for polymer-based materials, i.e., these glass/polymer alloys. The resultant more-durable alloy would be able to compete with glasses and ceramics as well.

In order to find a solution to increasing the durability, the mechanism of moisture corrosion was investigated. It was discovered that the weight and volume change commonly experienced with the subsequent reduction in properties was due, in part, to excess water incorporated by the alloys over and above that which could be attributed to the polymer fraction of the alloy. In other words, it was deduced that water was diffusing through the polymer and hydrating the phosphate glass phase.

There have been a number of references disclosed that have been directed towards methods of increasing the durability of phosphate glasses. For example, U.S. Pat. No. 4,079,022 (Ferrarini, Jr. et al.) discloses a glass composition comprising a relatively hydrophilic phosphate glass containing 50–72% mole percent $P_2O_5$ and having formed upon its surface water-insoluble phosphate salts of metals selected from the group consisting of magnesium, calcium, barium, iron, aluminum, lead and zinc. Also described therein is a method for forming the insoluble surface coating which comprises exposing the glass to an alkaline solution, containing at least one of the above listed metal ions, for a time sufficient to form the relatively water-insoluble component on the surface of the glass. Because alloy processing conditions typically cause the destruction of the coating formed on the glass, this method of increasing the glass durability is not effective and cannot be used in the formation of the glass/polymer alloys. Specifically, the high forces generated by the high shear dispersive mixing needed to form the glass/polymer alloys destroy the water-insoluble phosphate salt coating described by Ferrarini, Jr. et al.

SUMMARY OF THE INVENTION

Accordingly, an objective of the present invention was to produce a glass/polymer alloy and a method for making such an alloy which exhibits increased durability, thereby rendering the alloy less susceptible to hydration.

Another objective of the present invention was to provide for a stabilizer component for addition to, and stabilizing process for use with, a glass/polymer alloy which significantly slows the reaction of water with the phosphate glass.

Still another objective of this invention was to provide means for forming, in the presence of moisture, a protective coating on the phosphate glass phase which substantially increases the resistance of the alloy to moisture and, most preferably, can essentially stop the water uptake into the alloy, thereby rendering the glass less susceptible to hydration.

Still another objective of this invention was to provide for a stabilized glass/polymer alloy which maintains its physical performance properties over an extended period of time.

Hence, in broadest terms this invention discloses an alloy, and a method of making an alloy, of increased resistance to moisture, comprising a blend of the following components:

(a) a matrix material comprised of at least one organic thermoplastic or thermosetting polymer;

(b) at least one phosphate glass; and (c) an amount of a water soluble stabilizer component which provides a source of metal cations having a valency of 2+ or higher, whereby the amount is effective to improve the alloys' resistance to moisture.

Preferably, the mixture is comprised of the components in following approximate indicated weight proportions: (a) 5–80% of the polymer matrix material; (b) 15–90% of the phosphate glass; and (c) 0.1 to 40% of the stabilizer component.

One of the unique aspects of this alloy is that the glass elements within the alloy are believed to possess a partial surface layer comprised of a water soluble stabilizer component that constitutes a source of metal cations that lave a valency of 2+ or higher. This stabilizer component layer will, in the presence of moisture, release the metal cations to form either an insoluble metal phosphate or a hydrated metal phosphate surface layer that coats the entire surface of the phosphate glass. It is believed that this surface layer acts as a barrier which preferably essentially stops the water from reacting with the glass components. The final outcome is a significant increase in the durability of the alloy, with consequent retention of the constitution of the alloy body and its performance properties. Preferably, the metal cations which are found in the stabilizer component and form part of the insoluble surface layer are selected from the group consisting of $Ba^{2+}$, $Mg^{2+}$, $Ca^{2+}$, $Al^{3+}$, $Zn^{2+}$, $Sr^{2+}$ and $Fe^{3+}$.

PRIOR ART

U.S. Pat. No. 4,079,022 (Ferrarini) was reviewed above in some detail. Thus, as acknowledged there, the patent describes a phosphate glass composition possessing, and the method for forming, an insoluble phosphate salt coating on the surface of the glass. However, three fundamental differences distinguish the present invention from the Ferrarini reference. First, the Ferrarini reference claims a glass composition and a method for treating the glass composition, while the instant invention claims a glass/polymer alloy (as defined in the instant specification) and a method for enhancing the durability of the glass/polymer alloy by providing a means for coating the glass phase with insoluble layers, when in the presence of moisture. Second, the glass composition claimed in the Ferrarini patent is comprised of 50-72% $P_2O_5$, while the glass phase of the glass/polymer alloy contains only 28-40% $P_2O_5$. Third, the method of stabilization in the Ferrarini reference involves exposing the glass to an alkaline solution containing metal ions, while the instant invention involves the distinguishable step of adding a solid stabilizer component directly to a glass/polymer mixture. Rather than forming an insoluble layer as is disclosed in the reference, the instant invention discloses the formation of a water soluble stabilizer component layer which, in the presence of moisture, will release metal cations which then form part of an insoluble layer. Again, it should be pointed out that, because of the high forces generated in the formation of the inventive alloy, the Ferrarini-described glass coating would be destroyed; i.e., the teachings in the prior art reference would not be effective in the processing of glass/polymer alloys.

BRIEF DESCRIPTION OF THE DRAWINGS

FIGS. 1-8 are graphs illustrating the effect of the addition of a stabilizercomponent on the durability of the glass/polymer alloy.

DETAILED DESCRIPTION OF THE INVENTION

Figure 4:
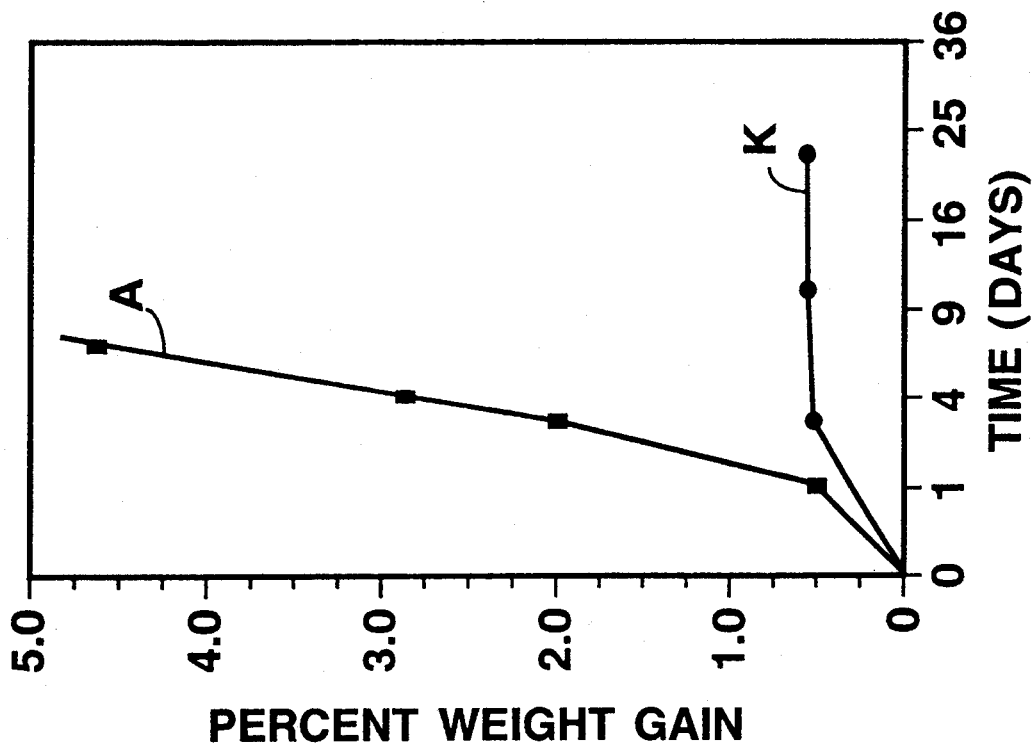
Figure 3:
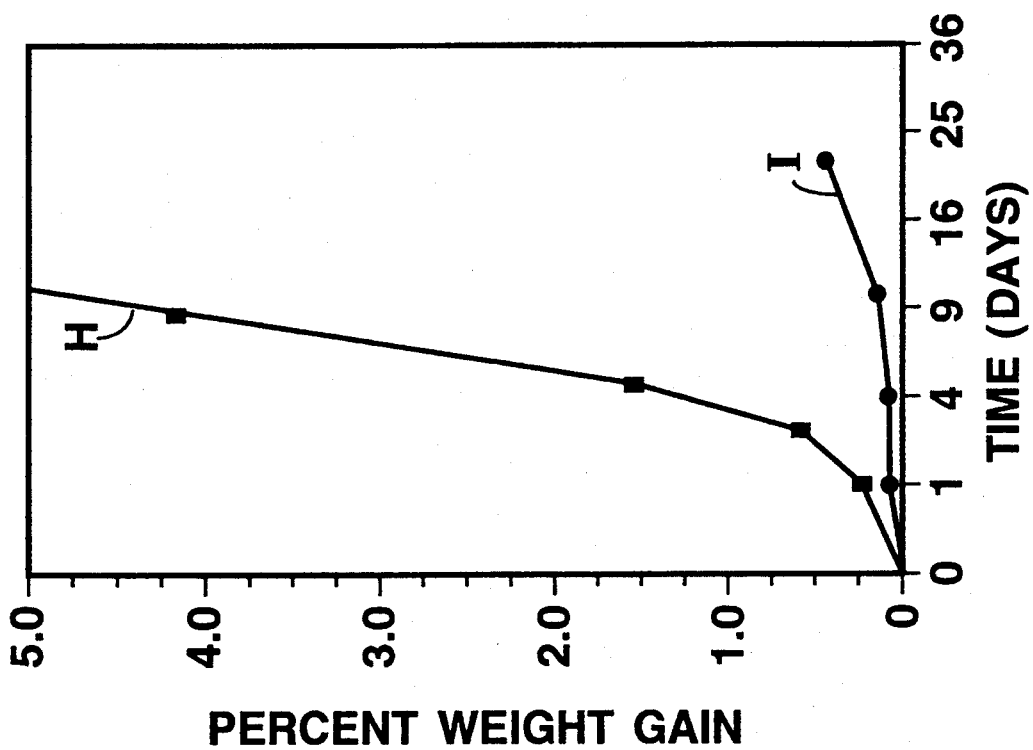
Figure 5:
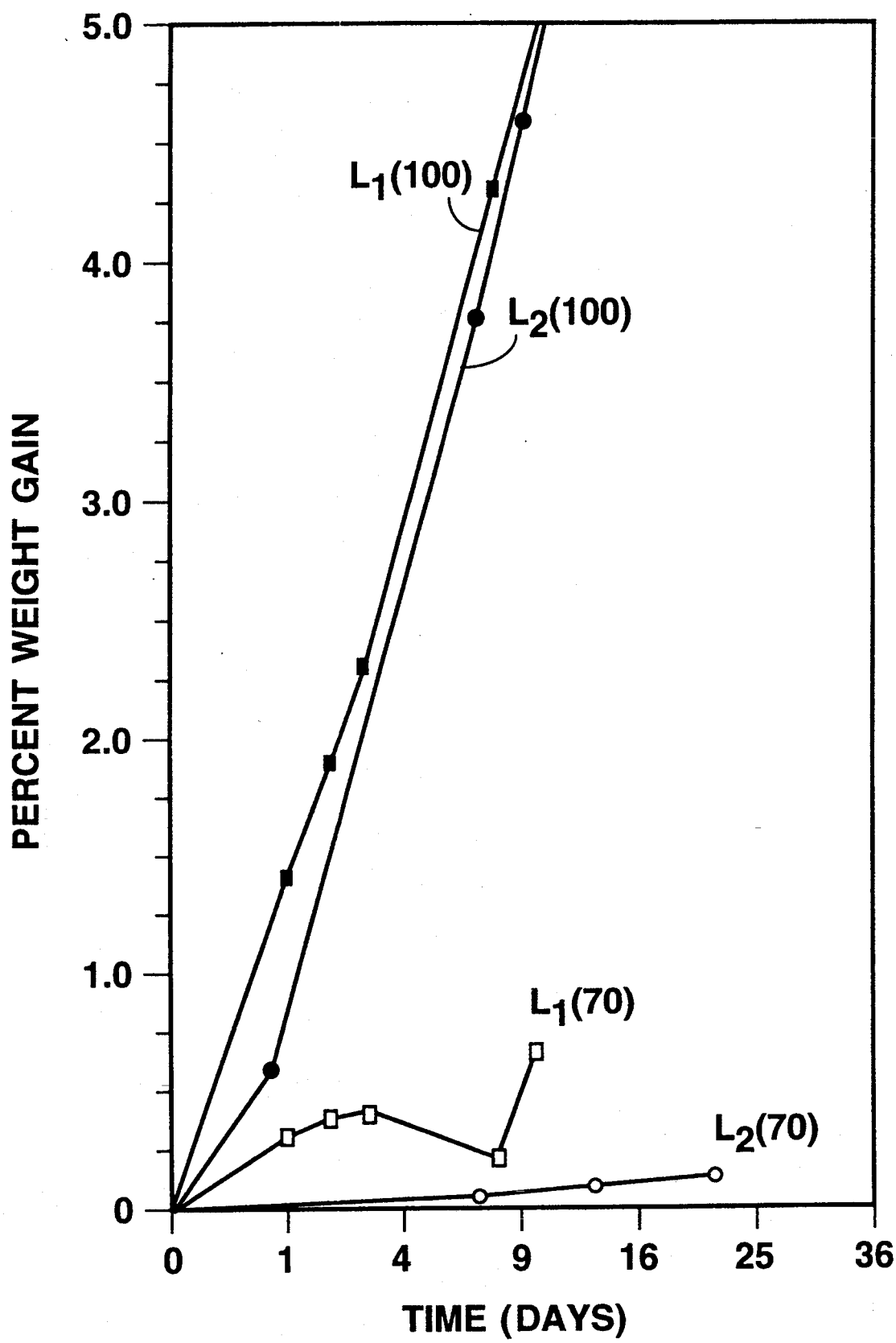
Figure 6:
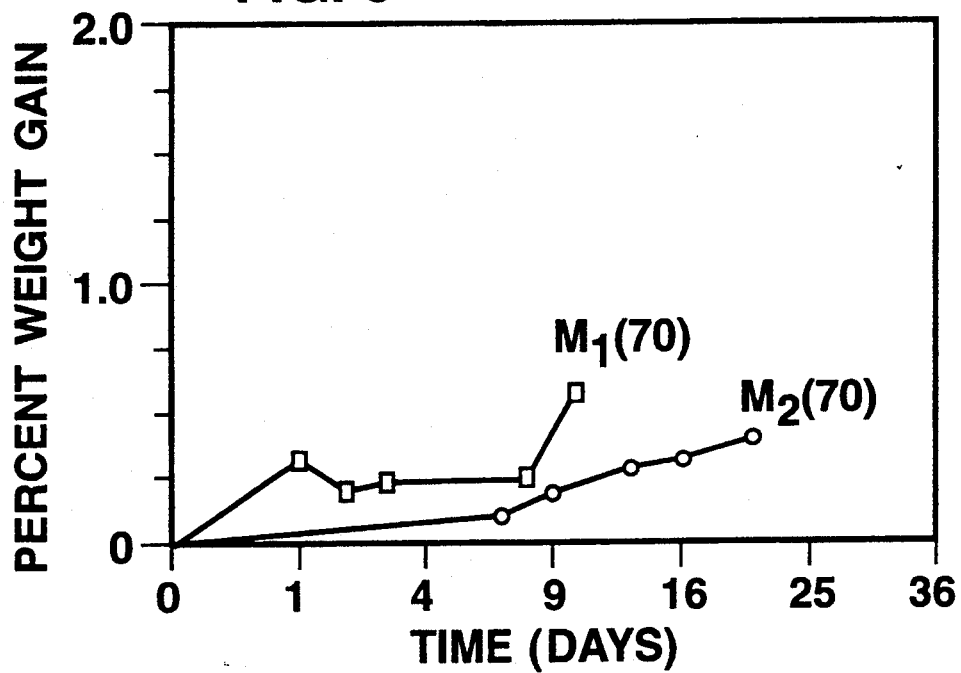
Figure 7:
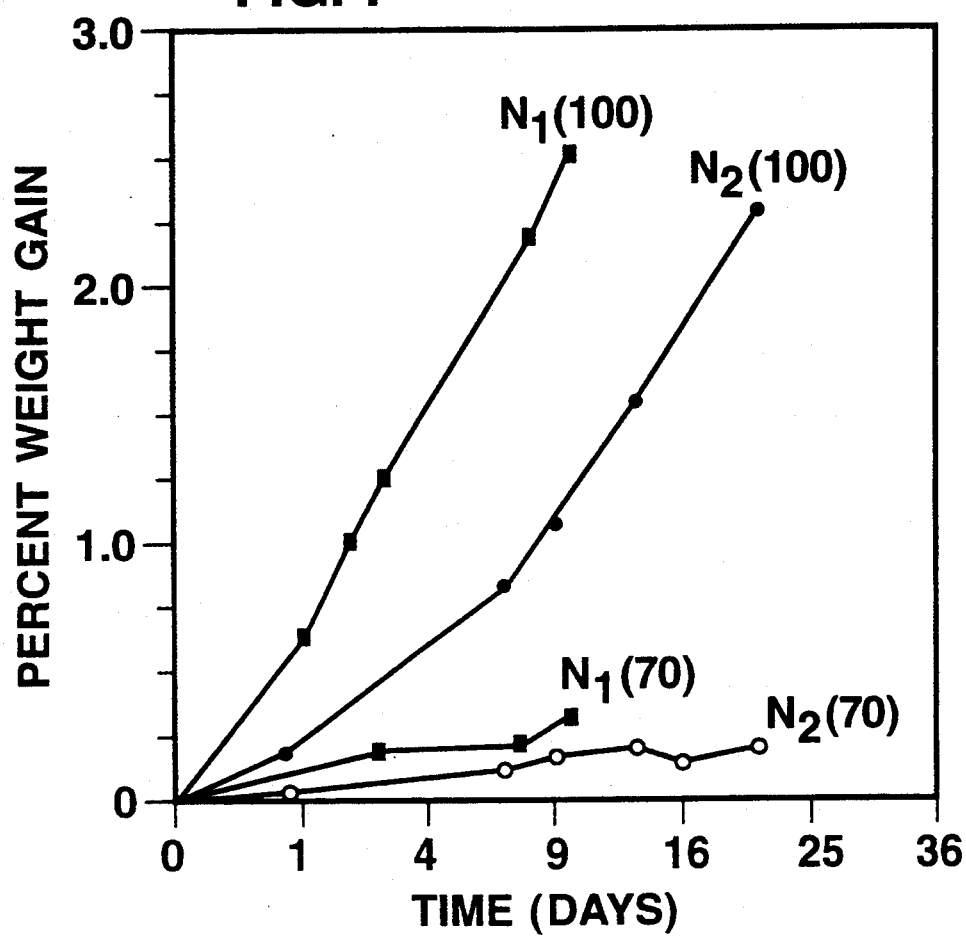
Figure 8:
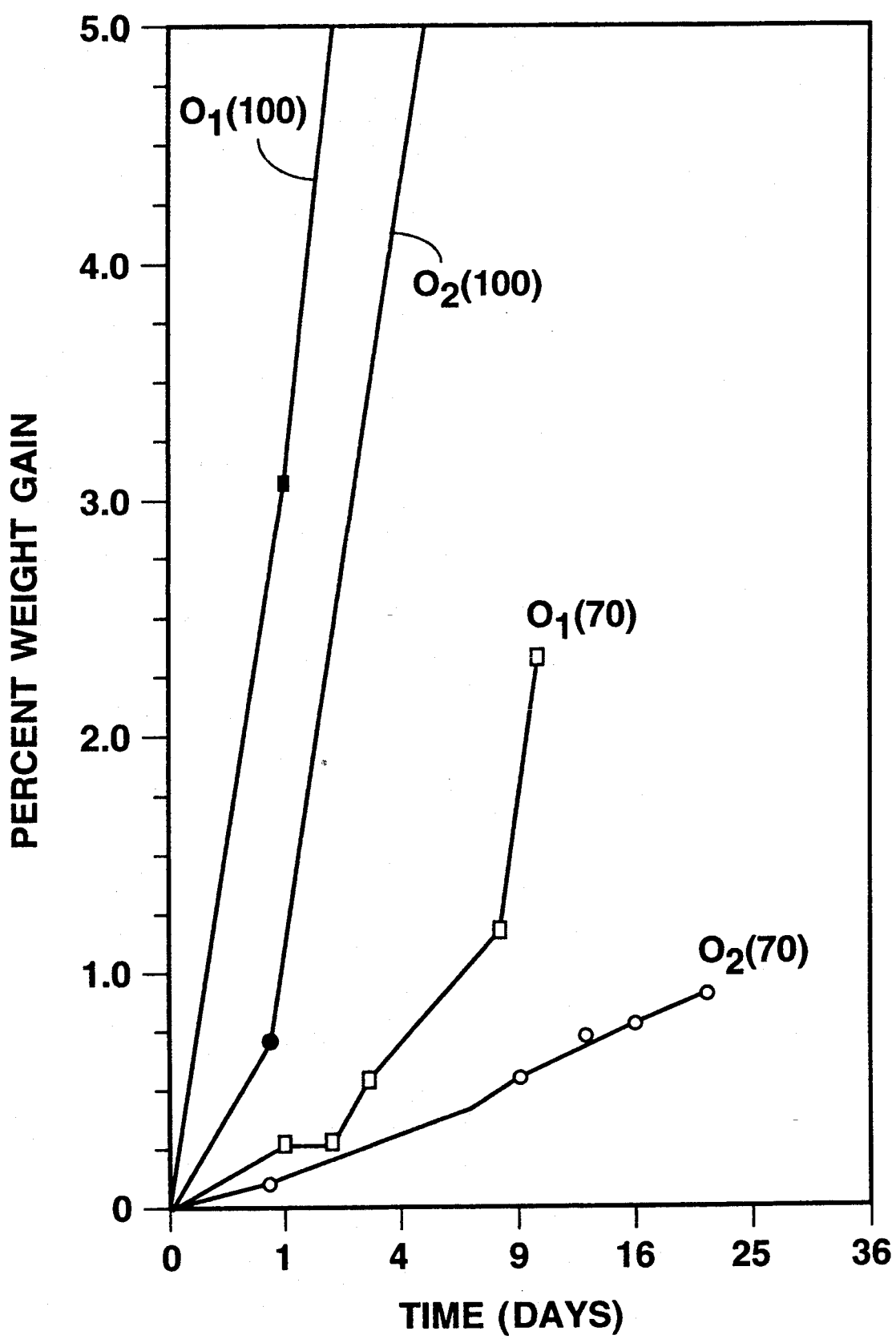

An alloy, as disclosed herein, is defined as a glass/polymer material which exhibits a uniform fine-grained microstructure comprised of a phosphate glass phase and an organic polymer phase. Uniform fine-grained microstructure, as used herein, is defined as one of the following: (1) an interconnected, co-continuous spinodal-type microstructure; or, (2) a microstructure consisting of fine spherical, ellipsoidal, and/or serpentine particles of glass separated by thin membranes of polymer and vice versa; or, (3) a fine emulsion of glass dispersed in polymer and vice versa; or, (4) localized phase inversion/reversal; that is, microstructures containing two co-continuous phases or one phase dispersed within another, wherein each phase region encloses very small portions or particles of the other phase. Stated in another way, the term alloy is used to describe a substance composed of two or more components intimately blended and united, specifically a phosphate glass and a polymer in this instance.

The term alloy should be distinguished from the related term composite which is defined as a mixture made up of distinct parts; in a glass/polymer composite there is no intimate blending of the distinct glass and polymer parts.

The microstructures which the present alloys exhibit are initially described in U.S. Pat. No. 5,043,369 (Bahn et al.). Furthermore, a discussion of the intimate blending of the glass and the polymer at the working temperature to form a body exhibiting an essentially uniform and fine-grained microstructure is also described therein. Since this information is germane to the present invention, it becomes necessary to incorporate by reference the Bahn et al. patent in its entirety into the present application.

The instant invention is an alloy of increased resistance to moisture comprising a blending of the following components:

(a) a matrix material comprised of at least one organic thermoplastic or thermosetting polymer;

(b) at least one phosphate glass possessing a working temperature such that it is thermally codeformable with the polymer; and (c) an amount of a water soluble stabilizer component which provides a source of metal cations having a valency of 2+ or higher, whereby the amount is effective to improve the alloy's resistance to moisture.

Preferably, the alloy's mixture is comprised of the following approximate indicated weight proportions: (a) 5-80% of the matrix material; (b) 15-90% of the phosphate glass; and (c) 0.1 to 40% of the stabilizer component.

The phosphate glasses, preferably comprising about 15-90 weight percent of the glass/polymer alloy mixture, include any phosphate glass which consists essentially, expressed in terms of mole percent on the oxide basis, of at least 65% total of 10-55% ZnO, 28-40% $P_2O_5$, and 10-35% $R_2O$, wherein $R_2O$ consists of at least two alkali metal oxides in the indicated proportions selected from the group consisting of 0-25% $Li_2O$, 0-25% $Na_2O$, and 0-25% $K_2O$. The glasses may include up to 35% total of optional ingredients in the indicated proportions selected from the group consisting of 0-10% $Al_2O_3$, 0-15% $B_2O_3$, 0-15% $Cu_2O$, 0-25% $Sb_2O_3$, 0-35% PbO, 0-35% SnO, 0-5% $ZrO_2$, 0-4% $SiO_2$, 0-20% MgO, 0-20% CaO, 0-20% SrO, 0-20% BaO and 0-10% MnO, 0-5% rare earth metal oxide and 0-5% F, the latter as analyzed in weight percent. As additional requirements for the glass composition, the amount of $Al_2O_3+B_2O_3$ should not exceed about 15 weight percent of the glass, the combined amount of PbO+SnO should not exceed 35 weight percent, and the total amount of MgO+CaO+SrO+BaO+MnO should not exceed 20 weight percent.

TABLE I records a group of preferred glass compositions, expressed in terms of mole percent on the oxide basis, used in preparing the inventive glass/polymer alloys of the present invention. Each glass was compounded from oxide, carbonate, and phosphate batch materials. Those batch materials were automatically tumble-mixed or ballmilled and melted in silica crucibles at temperatures in the vicinity of 1000° C. for times of about three hours. Very little volatilization of $P_2O_5$ was noted; analyzed values of $P_2O_5$ were typically only a few tenths percent below that calculated from the batch.

TABLE I

|  | 1 | 2 | 3 |
|---|---|---|---|
| $P_2O_5$ | 33 | 30 | 33 |
| ZnO | 43 | 39 | 40 |
| $Al_2O_3$ | 2 | 2 | 2 |
| $Li_2O$ | 6 | 7 | 7 |
| $Na_2O$ | 7 | 8 | 8 |
| $K_2O$ | 7 | 5 | 5 |
| SnO | — | — | 5 |
| $MgF_2$ | — | 3 | — |
| $CaF_2$ | — | 3 | — |
| $BaF_2$ | — | 3 | — |
| $SiO_2$ | 2 | — | — |

Because a pulverized material was desired to form feedstock for extrusion; the melts were poured through patterned metal rollers to produce a textured surface which was easily crushed to predetermined-sized fragments; or more preferably the melts were poured as a fine stream into a bath of cold water, a practice termed "drigaging". If desired, the glass particles/fragments may be pelletized for ease of handling.

The polymer phase of the alloy mixture comprising about 5 to 80 weight percent of the total alloy consists of at least one organic thermoplastic or thermosetting polymer. Although the later-described examples contain only polyetherketone and liquid crystal polyester, it is contemplated that the increase in durability as a result of the stabilizer component would also occur in alloys containing a phosphate glass and other various polymers having processing or working temperatures compatible with those exhibited by the glasses. Polymers specifically contemplated as within the scope of the invention are thermoplastics such as polyethersulfone, polypropylene, polyaryletherketones, polyolefins, ABS, polystyrenes, polyphenylene sulfides, polyfluoro resins, polyetherimides, liquid crystal polyesters, polyetheretherketones, polyetherketones, polyethylterephthalates, polybutylterephthalates, melamines, polyamides, polyphosphazenes and polycarbonates. Thermosets, including epoxy resins, silicone resins, polyimides, phenolics, and diallyl phthalates should also be included within the scope.

The stabilizer component, comprising preferably about 0.1 to 40 weight percent of the total alloy mixture, should ideally be added in an amount whereby the resultant alloy will possess a durability which is improved over that exhibited by an unstabilized alloy. In other words, a "stabilized alloy" is one in which there is an improvement in durability as evidenced by a decrease in the percent weight gain of the alloy over time. It is important to note that a stabilized alloy, i.e., one which possesses the effective amount of a stabilizer, cannot be defined by a standard test (e.g., less than X % weight gain in 50° C. in X hours), because the amount of water that the alloy absorbs and, ultimately the weight the lower durability glass component gains, is variable depending upon the amount of glass in the blend and the transmission rate of the polymer utilized in the alloy; water transmission varies from polymer-to-polymer and as well as from test temperature-to-test temperature. Therefore, although the instant invention measures the weight gain at both 70° C. and 100° C. for either a PEK, PEEK or LCP-based alloy, the improvement cannot be defined in terms of these conditions because of this variability.

For a material to be an effective stabilizer component it must meet certain requirements. First, the stabilizer component must be a source of metal cations which have a valency of 2+ or greater. Additionally, the stabilizer component should be able to partially dissolve in water, thereby releasing ions or ionic complexes which would then be available to react with the surface layer of the glass to form the insoluble and durable metal phosphate or hydrated metal phosphate layer. For example, although $TiO_2$, $Al(OH)_3$, and $Al_2O_3$ all are sources of metal cations having a valency of 2+ or higher, they exhibited a solubility in hot water that is too low to provide the sufficiently high concentration of ions or ionic complexes needed to form the insoluble phosphate layer. On the other hand, the additive must not be so soluble in water that it causes its own durability problem; i.e., a solubility so high such that water readily attacks the additive itself leaving a porous layer. By way of example, $CaCl_2$ is a compound that is too soluble to function as a stabilizer additive; whereas $CaCO_3$, having a much lower but reasonable solubility, is an effective stabilizer component. Specifically, for a stabilizer component to be effective its solubility should be within the range of 0.00001 to 0.1 g/100 cc in 25° C. $H_2O$ after 24 hours. Therefore, the actual constituent to be added to the glass/polymer blend as the stabilizer component comprises any material, either oxide or other compound, which satisfies the above requirements, an example being the use of ZnO as a stabilizer component.

The preferred group of stabilizer components should be a source of metal cations selected from the group consisting of $Ba^{2+}$, $Mg^{2+}$, $Ca^{2+}$, $Al^{3+}$, $Zn^{2+}$, $Sr^{2+}$ and $Fe^{3+}$, with $Zn^{2+}$ being the most preferred.

Generally speaking, alloy processing involves first thoroughly drying the finely-divided fragments/pellets of glass, the stabilizer component, and pellets or powders of organic polymer. Once dried, the fragments are fed into a twin screw extruder programmed to operate at temperatures at which the glasses exhibit a viscosity within the range of about $10^4$–$10^7$ poises, i.e., a temperature and viscosity represented by the working temperature of the glass. High shear forces of at least about 1000 secs$^{-1}$ generated in the extruder assure very fine melt mixing at those viscosities. The so-mixed material is then extruded in a rod-like form into the ambient environment.

The extrudate is then pelletized, thoroughly dried, and fed into an injection molding machine. Depending upon the glass composition and the polymer involved, the injection molder is programmed to operate at temperatures ranging about 300°–430° C. and at pressures in excess of 15,000 psi.

The following description outlines specific extrusion, stabilization and injection molding parameters employed in the examples reported below:

In each example the glass fragments/pellets having an average particle size of about 10 microns were dried overnight in a forced air oven operating at about 150° C. Thereafter, they were combined with pellets of polymer having a similar average particle size and with the stabilizer component having a fine particle size, generally less than 5 microns, and fed into a 34 mm twin screw extruder, marketed by the American Leistritz Extruder Corporation, Somerville, N.J., to achieve the desired fine mixing of glass, stabilizer component and polymer. The extruder exhibits high shear forces of approximately 1000 secs.$^{-1}$ and is designed to have the capability of providing a temperature profile along the length of the barrel thereof. To illustrate, typical extrusion conditions for the glasses and polymers of the following examples involved temperatures between about 300°–360° C. in the first zone, about 320°–430° C. in the second zone, about 320°–430° C. in the third zone, and a die temperature between about 320°–430° C. A rotor speed of about 25–35 rpm was utilized. In each example the glass/polymer extrudate was pelletized and dried overnight in a forced air oven operating at 150° C. before being fed into a 170 ton Toshiba reciprocating screw injection molding machine. A moisture level less than about 0.01% was commonly measured. The machine was capable of operating at three different internal temperature regions plus a separate nozzle temperature. Typical molding conditions for the glass/polymer alloys of the following examples utilized temperatures between about 340°–375° C. in the rear zone, about 350°–400° C. in the center zone, about 360°–415° C. in the front zone, and an nozzle temperature between about 370°–435° C. Die temperatures generally ranged about 175°–290° C. Injection pressures and screw speeds varied with the chemistries of the glass/polymer alloy, the proportions of each component, and the temperatures and times employed in molding.

TABLE II records several representative alloy compositions, both stabilized and unstabilized, which were prepared from the glass compositions recited in TABLE I and then extruded and injection molded into 5"×0.5"×0.125" test bars. These test bars were then utilized in the later-described durability tests. Table III records additional alloy compositions, both unstabilized and stabilized, also prepared from the glasses recited in Table I. It is imperative to note that, although all values listed in Table III are listed in weight percent, each of the stabilized examples contains an equivalent volume percent of glass as that of the unstabilized; i.e., although the stabilized comparison examples consist of three components (addition of the stabilizer), the volume fraction of the glass remains the same.

In Tables II and III the abbreviations present therein have the following meanings:

PEK refers to the polyetherketone currently marketed as Victrex ® and commercially available from the ICI Americas, Inc., Wilmington, Del.

LCP refers to the liquid crystal polymer currently marketed as Xydar ® and commercially available from the Amoco Performance Products Corporation, Atlanta, Ga.

TRI refers to a polymer mixture of 33.33% by weight Xydar ® 700 liquid crystal polyester, marketed commercially by the Amoco Performance Products Corporation, 33.33% by weight Xydar ® 900 liquid crystal polyester, marketed commercially by the Amoco Performance Products Corporation, and 33.33% by weight PEEK 450P polyetheretherketone marketed by ICI Americas, Inc., Wilmington, Del.

ZnO refers to the use of zinc oxide as the stabilizer.

CaCO$_3$ refers to the use of calcium carbonate as the stabilizer.

The ratios of glass to polymer to stabilizer, e.g., 50/30/20;Ex.1/PEK/ZnO, reflect weight % glass to weight % polymer to weight percent stabilizer; in other words, 50% Example 1 glass to 30% polyetherketone to 20% zinc oxide stabilizer.

TABLE II

| Alloy Example | Weight Ratio | Components |
|---|---|---|
| A | 45/55/-- | Ex.1/PEK/-- |
| B | 50/30/20 | Ex.1/PEK/ZnO |
| C | 40/40/20 | Ex.1/PEK/ZnO |
| D | 70/30/-- | Ex.1./PEK/-- |
| E | 60/20/20 | Ex.1/PEK/ZnO |
| F | 60/20/20 | Ex.2/PEK/ZnO |
| G | 40/40/20 | Ex.3/LCP/ZnO |
| H | 70/30/-- | Ex.3/LCP/-- |
| I | 50/40/10 | Ex.3/LCP/ZnO |
| J | 65/35/-- | Ex.3/LCP/-- |
| K | 45/17/38 | Ex.2/PEK/CaCO$_3$ |

TABLE III

| Alloy Example | Weight Ratio | Components |
|---|---|---|
| L$_1$ | 40/60 | Ex.3/TRI/-- |
| L$_2$ | 40/59.5/0.5 | Ex.3/TRI/ZnO |
| M$_1$ | 50/50 | Ex.3/TRI/-- |
| M$_2$ | 50/49.5/0.5 | Ex.3/TRI/ZnO |
| N$_1$ | 21.63/78.37 | Ex.3/TRI/-- |
| N$_2$ | 20/70/10 | Ex.3/TRI/ZnO |
| O$_1$ | 88.32/11.68 | Ex.3/TRI/-- |
| O$_2$ | 85/10/5 | Ex.3/TRI/ZnO |

FIGS. 1–8 report that the addition of a stabilizer component to the glass/polymer alloy results in an increase in the durability of the alloy; the stabilized examples all have decreased water retention, as evidenced by the lowered weight gain exhibited by those stabilized alloy examples. Specifically, the accelerated durability test involved placing test bars of each composition example in deionized water maintained at specified temperatures, 70° C. and/or 100° C. The test bars were then removed and weighed at periodic intervals. The weight gain data was then convened to a percentage gain and plotted to generate the curves illustrated in FIGS. 1–8; FIG; FIGS. 1–4 report the durability (percentage weight gain) for the samples as measured at 100° while FIGS. 5–8 report the durability as measured at both 70° C. and 100° C. For example, the data reported in Tables IV and V are the actual weight (Wt$_{70}$, Wt$_{100}$), the interval at which sample was weighed (Hrs) and the percentage weight gain which was generated (ΔWt %$_{70}$, ΔWt %$_{100}$) for Examples N$_1$ and N$_2$, respectively, at both 70° and 100° C. This data were plotted to generate the specific curves reported FIG. 7.

TABLE IV

| Hrs. | Wt.$_{70}$ | ΔWt. %$_{70}$ | Wt.$_{100}$ | ΔWt. %$_{70}$ |
|---|---|---|---|---|
| 0 | 8.6983 | — | 6.0074 | — |
| 20 | 8.7024 | .04% | 6.0197 | .20% |
| 164 | 8.7107 | .14% | 6.0587 | .85% |
| 220 | 8.7148 | .18% | 6.0745 | 1.11% |
| 313 | 8.7166 | .21% | 6.1022 | 1.57% |
| 385 | 8.7155 | .19% | 6.1193 | 1.86% |
| 508 | 8.7172 | .21% | 6.1453 | 2.29% |

TABLE V

| Hrs. | Wt.$_{70}$ | ΔWt. %$_{70}$ | Wt.$_{100}$ | ΔWt. %$_{100}$ |
|---|---|---|---|---|
| 0 | 5.3440 | — | 6.0561 | — |
| 25 | 5.3760 | .59% | 6.0958 | .65% |
| 45 | 5.3650 | .39% | 6.1177 | 1.01% |
| 67 | 5.3530 | .16% | 6.1321 | 1.25% |
| 189 | 5.3534 | .17% | 6.1885 | 2.18% |
| 234 | 5.3607 | .31% | 6.2071 | 2.49% |

It can be readily seen in FIGS. 1–4 that each of the unstabilized Examples, A,D and H, exhibited much larger percentage weight gains than the stabilized Examples. Although the volume percent of the glass is reduced in the stabilized examples, it is still clear that they are stabilized due to the large decrease in the weight gain exhibited by those stabilized examples. For instance, FIG. 2 illustrates that the ZnO-stabilized Example E was extremely more durable than the unstabilized Example D; Example E exhibited a 0.65% weight gain in 6 weeks while Example D exhibited a weight gain of >4% in only 4 days. FIG. 4 reports that the $CaCO_3$-stabilized Example K exhibited approximately a 0.6% weight gain in about 25 days, while the unstabilized Example A (same glass weight percent) exhibited nearly a 5% weight gain in approximately 9 days.

Each of the FIGS. 5–8 compares an unstabilized sample with a stabilized example having an equivalent volume percent of lower durability, water-uptake glass component. It thus becomes even clearer that the increase in durability, i.e., the ability to resist moisture, is due to the addition of the inventive stabilizer component. Taking a look at FIGS. 5–8, all of the stabilized examples ($L_1$-$O_1$) have a lower weight gain over time when compared to that of the unstabilized examples ($L_2$-$O_2$); thus a durability improvement is achieved with the addition of the stabilizer component.

Further evidence of the increase in durability is reported in TABLE VI. Each of the examples was tested for strength retention by again placing test bars in the accelerated 100° C. water test for twenty-one (21) days. Over this period of time the Modulus of Rupture (MOR) was periodically tested (0, 1, 5 and 21 days' exposure). The MOR is reported in Kpsi. TABLE VI reports that the Examples which have been stabilized through the addition of ZnO retain their strength better than the unstabilized phosphate glass/PEK blend. For example, the ZnO stabilized Example C retained 89% of its original strength in 21 days, as compared to the same glass/polymer alloy composition unstabilized, which retained only 40% of its strength in 5 days; in 21 days the unstabilized sample had swelled to a point such that its strength could not be measured. It thus can be inferred that the strength retention is a direct consequence of improved durability. In other words, the addition of the ZnO stabilizer prevented the hydration of the phosphate glass, thereby greatly improving the durability of the alloy, which, in turn, led to a stabilization of the strength.

TABLE VI

| Example No. | Initial MOR | MOR: day 1 | MOR: day 5 | MOR: day 21 |
| --- | --- | --- | --- | --- |
| D | 15.4 | 11.2 | 6.2 | could not be measured |
| C | 15.2 | 14.0 | 13.7 | 13.5 |
| J | 12.4 | 11.9 | <5 | could not be measured |
| I | 8.5 | 7.6 | 6.7 | 6.5 |

While not intending to be limited by theory, the mechanism of stabilization, i.e., the increase in durability, is thought to be the result of the formation of an insoluble and durable surface layer or coating which forms on the surface of the phosphate glass elements of the alloy material. As this coating is insoluble, its acts as a barrier which prohibits water from entering the glass structure and causing the subsequent swelling, weight gain and reduction in performance of the glass/polymer alloy. Specifically, this insoluble metal phosphate or hydrated metal phosphate layer is a result of the metal cation stabilizer reacting with the phosphate groups found in the phosphate glass. Therefore, it is thought that the actual formation of the coating or protective layer occurs when external moisture enters the glass-/polymer/stabilizer alloy, thereby causing the stabilizer component which partially covers the surface of the glass phase to dissolve and thereby release the stabilizer metal cation. The phosphate groups, either in solution because the water or moisture has partially hydrated the glass creating phosphate ions, or as phosphate sites on the surface of the glass, then react with the metal cation to form the insoluble protective layer, which covers the entire surface of the glass.

We claim:

1. An alloy of increased resistance to moisture comprising a mixture of the following components, in the following approximate indicated weight proportions:
   (a) 5–80% of a matrix material comprised of at least one organic thermoplastic polymer;
   (b) 15–90% of at least one phosphate glass possessing a working temperature such that it is thermally codeformable with the polymer, wherein the phosphate glass consists essentially, expressed in terms of mole percent on the oxide basis, of at least 65% total of 10–55% ZnO, 28–40% $P_2O_5$ and 10–35% $R_2O$, wherein $R_2O$ consists of at least two alkali metal oxides in the indicated proportions selected from the group consisting of 0–25% $Li_2O$, 0–25% $Na_2O$ and 0–25% $K_2O$, and up to 35% total of optional ingredients in the indicated proportions selected form the group consisting of 0–10% $Al_2O_3$, 0–15% $B_2O_3$, 0–15% $Cu_2O$, 0–25% $Sb_2O_3$, 0–35% PbO, 0–35% SnO, 0–5% $ZrO_2$, 0–4% $SiO_2$, 0–20% MgO, 0–20% CaO, 0–20% SrO, 0–20% BaO, 0–10% MnO and 0–5% rare earth metal oxide, and 0–5% F, as analyzed in weight percent, wherein $Al_2O_3+B_2O_3$ does not exceed 15%, PbO+SnO does not exceed 35%, and MgO+CaO+SrO+BaO+MnO does not exceed 20%; and,
   (c) an amount of at least one water soluble stabilizer component which provides a source of metal cations having a valency of 2+ or higher, whereby the amount is effective to improve the alloy's resistance to moisture, the stabilizer component exhibiting a solubility within the range of 0.00001 to 0.01 g/100 $cm^3$ in 25° C. $H_2O$ after 24 hours.

2. The alloy as claimed in claim 1 wherein the metal cation is selected from the group consisting of $Ba^{2+}$, $Mg^{2+}$, $Ca^{2+}$, $Al^{3+}$, $Zn^{2+}$, $Sr^{+2}$ and $Fe^{3+}$.

3. The alloy as claimed in claim 1 wherein the matrix material is comprised of a high temperature thermoplastic selected from the group consisting of polyethersulfone, polypropylene, polyaryletherketones, polyolefins, ABS, polystyrenes, polyphenylene sulfides, polyfluoro resins, polyetherimides, liquid crystal polyesters, polyetheretherketones, polyetherketones, polyethylterephthalates, polybutylterephthalates, melamines, polyamides, polyphosphazenes and polycarbonates.

4. The alloy as claimed in claim 1 wherein the alloy exhibits an essentially uniform, fine-grained microstructure of polymer and glass elements, wherein the glass elements possess a partial surface coating comprised of the stabilizer component which, in the presence of moisture, releases the metal cations to form either an insoluble metal phosphate or a hydrated metal phosphate surface layer.

5. The alloy as claimed in claim 1 wherein the amount of the stabilizer component as measured in weight percent is between 0.1 to 40%.

* * * * *